Feb. 9, 1943.                A. E. ANDERSEN                2,310,887
            HOOK-ON-AND-RELEASE MECHANISM FOR A FIGHTING TANK
                              Filed May 6, 1941
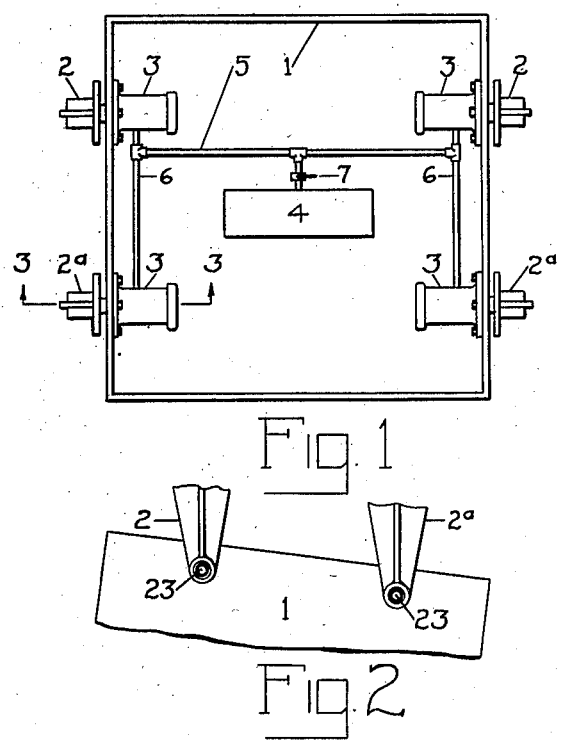
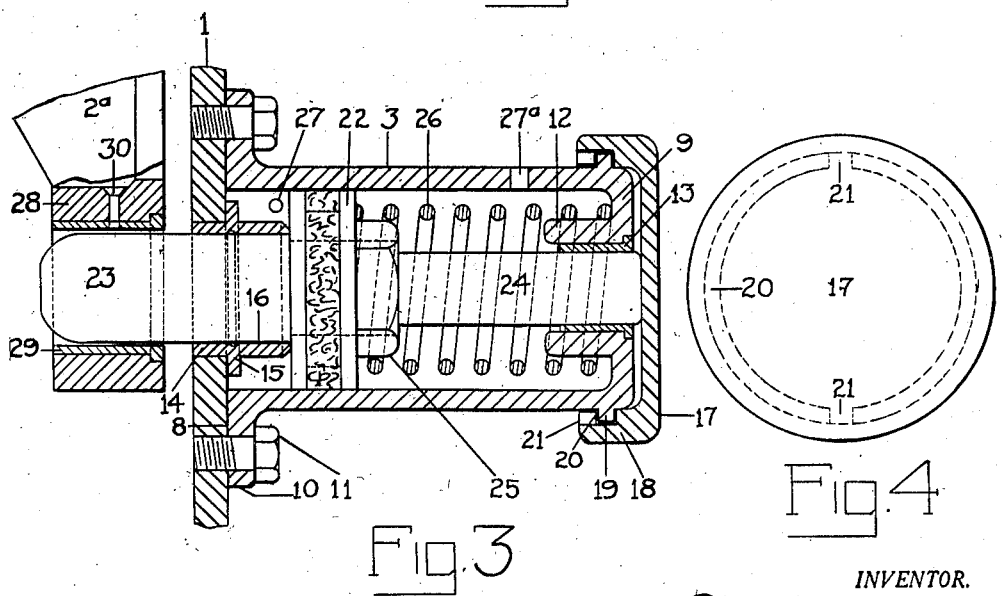
INVENTOR.
Alfred E. Andersen.
BY
ATTORNEY Patented Feb. 9, 1943

2,310,887

UNITED STATES PATENT OFFICE 2,310,887

HOOK-ON-AND-RELEASE MECHANISM FOR FIGHTING TANKS

Alfred E. Andersen, Brooklyn, N. Y., assignor to Armored Tank Corporation, New York, N. Y., a corporation of New York Application May 6, 1941, Serial No. 392,047

4 Claims. (Cl. 89—1)

An object of the present invention is to provide a means for suspending a fighting tank from an airplane for the purpose of transporting the tank and for discharging the tank from the airplane whilst the plane is in flight.

Another object of the invention is to provide a means of the character described which is fluid pressure actuated and embodies selectively controllable means for locking the device against movement when accidentally acted upon by the said fluid pressure.

Referring now to the drawing: Fig. 1 shows a diagrammatic arrangement of the invention with the airplane and fighting tank in assembled position ready for transportation of the tank; Fig. 2 shows in elevation the cooperating portions of the airplane and tank; Fig. 3 is a section taken longitudinally of one of the fluid pressure actuated cylinders as indicated by lines 3—3 on Fig. 1; Fig. 4 shows an end elevation of one of the fluid pressure actuated cylinders of Fig. 1 illustrating one form of the locking mechanism.

Referring now in detail to the drawings where like reference characters refer to like parts, and particularly Fig. 1 of the drawing; reference character 1 indicates a portion of a fighting tank of suitable design, at the opposite sides of which are shown portions 2 and 2ᵃ of brackets which depend from an airplane of suitable design and are secured to the airplane in a suitable manner. Within the tank and secured to the inner face of the walls forming the portion 1 are a plurality of fluid pressure chambers 3 so disposed that there is one of said chambers 3 adjacent each bracket portion 2 and 2ᵃ. Within the tank portion 1 and indicated by reference character 4 is a suitable source of fluid pressure which is connected with each fluid pressure chamber 3 by means of suitable piping such as 5 and 6. The simultaneous admission of fluid pressure from the source 4 through the piping 5 and 6 to the fluid pressure chambers 3 is controlled by a suitable valve 7 which includes a means for exhausting fluid pressure from within the piping 5 and 6.

Referring now to Fig. 3 of the drawing which illustrates a longitudinal section through bracket 2, tank portion 1 and fluid pressure chamber 3, it will be observed that the plane bracket 2ᵃ whilst disposed adjacent the tank wall 1 is preferably in spaced relation thereto for the ready positioning of the tank portion 1 between the brackets. Each fluid pressure chamber 3 comprises a preferably cylindrical body portion having the opposite end portions 8 and 9 apertured. The end portion 8 of the chamber 3 terminates in a preferably cylindrical flange 10 disposed against the wall 1 and attached thereto by suitable fastening members such as 11. In order to prevent escape of fluid pressure I preferably place a suitable gasket between the flange 10 and the wall portion 1. The aperture in the chamber end portion 8 is preferably of the same size and shape as the interior of the chamber 3 to provide for the ready assembly of the piston and other mechanism within the chamber, as will be hereinafter described. In the wall 1 is a suitable aperture within which is mounted the bushing 14 so as to be preferably flush with the outer face of the wall 1 and having a flange 15 embracing the inner face of the wall 1. This bushing 14 has a portion 16 projecting inwardly of the chamber 3 serving as a stop for the contained piston and providing increased bearing for the piston stem. The chamber end portion 9 has an aperture therein smaller than that of the chamber end portion 8 and is preferably surrounded by an inturned flange 12 for a purpose hereinafter described. Seated within the said aperture and flange 12 is a bushing 13. Mounted on the chamber 3 adjacent the end wall 9 is a lock cap 17 having flanges 18 overlapping the chamber 3. Formed integral with the chamber 3 are oppositely disposed lugs 19 adapted to be engaged by an internal channel 20 in the flange 18 of the cap 17 to lock the cap 17 in position on the chamber 3. The channel 20 has suitably placed angularly disposed grooves 21 extending inwardly from opposite sides of the free end of the flange 18 to permit passage of the flange 18 over the lugs 19 on the chamber 3 when assembling the cap 17 thereon.

Within the chamber 3 is mounted a reciprocating piston assembly comprising a piston 22 having a stem portion 23 extending from one side thereof and a stem portion 24 extending from the opposite side thereof. The stem portion 23 which is formed integral with stem portion 24 is of greater diameter than stem portion 24 and provides a shoulder against which the piston 22 is disposed and is secured in place on the piston stem by means of a suitable fastening member such as the nut 25. Enclosing the stem portion 24 and disposed between the piston 22 and end wall 9 of the chamber 3 is a compression spring 26 which also encircles the flange 12 of chamber end wall 9. As illustrated in Fig. 3 the compression spring 26 normally holds the piston 22 against the projection 16 of the bushing 14 in the tank side wall 1 so that the portion 23 of the piston stem extends through the bushing 14 and beyond the tank wall 1 for engagement within the plane bracket 2. In this latter position of the piston, the stem portion 24 is seated in the bushing 13 of the chamber wall 9 and extends to adjacent the outer face thereof. When the cap 17 is mounted on the chamber 3, it forms an abutment for the stem portion 23 to prevent movement of the piston 22 inwardly of the chamber 3. In the wall of chamber 3 and between the normal position of piston 22 and the adjacent end of the chamber 3 is a suitable aperture 27 for admission of fluid pressure. This aperture is connected with the piping 5 and 6 as illustrated in Fig. 1. Likewise in the wall of chamber 3 is an aperture 27a through which air, trapped behind the piston, escapes to permit free movement of the piston under the aforesaid fluid pressure.

As illustrated in Figs. 1 and 2 of the drawing, the plane brackets 2 and 2a disposed adjacent the side walls 1 of the tank may be of any suitable design having a suitable apertured end portion 28 within which is mounted a bushing 29 engaged by the piston stem portion 23 to suspend the fighting tank from the airplane. As illustrated in Fig. 3 of the drawing, after the bushing 29 is assembled in the bracket, an oil hole 30 may be drilled into the bracket for admission of lubricant. As illustrated in Fig. 2 of the drawing the relation between the bracket 2 and bracket 2a at each side of the tank is such that the bracket 2 adjacent the front of the plane depends a lesser distance from the plane than does the bracket marked 2a. Thus when the plane is in flight and positioned to drop the tank, the tank is disposed at an acute angle with the ground.

From an examination of Figs. 1 and 2 of the drawing it will be obvious that when it is desired to assemble the tank in position beneath the airplane, an operator within the tank removes caps 17 from each pressure chamber 3 and then opens the control valve 7 admitting fluid pressure from the source 4 to the fluid pressure lines 5 and 6 which, in turn, carry the fluid pressure into the chambers 3 through the apertures 27, forcing the piston 22 inwardly of the chamber, thereby projecting the piston stem portion 24 through the aperture in the end wall 9 of the chamber and retracting the piston stem portion 23 within the chamber 3 so as to position the outer end of the piston portion 23 substantially within the plane of the outer face of the tank side wall 1. The plane and tank are then moved to a position where the piston stem portions 23 within each chamber 3 are in register with the apertures in bushings 29 in the adjacent plane brackets 2 and 2a. Thereafter the operator moves the valve 7 to a position to exhaust fluid pressure from the lines 5 and 6 and the compression springs 26 within each chamber 3 move the piston 22 outwardly until the piston engages the end portion 16 of the bushing 14 in the adjacent tank wall 1. During this movement of the piston 22 the piston stem portion 23 moves into engagement with the aperture in bushing 29 of the plane bracket 2 or 2a, as illustrated in Fig. 3 of the drawing. Thereafter the operator within the tank places a cap 17 upon the end of each chamber 3 moving grooves 21 over lugs 19 until the lug enters channel 20 of the cap, as illustrated in Fig. 3 of the drawing, thereafter by giving the cap 17 a quarter turn it is locked on the chamber 3 and the piston 22 within each chamber is blocked against accidental movement. In this manner the tank and plane are secured in assembled relation.

After the takeoff of the plane and the plane has levelled off so as to be in a position substantially horizontal when in flight the tank, due to the relation between the plane brackets 2 and 2a, assumes a position illustrated in Fig. 2 of the drawing. When it is desired to land the tank whilst the plane continues in flight, the operator within the tank removes caps 17 from each chamber 3 and the plane approaches to within a few feet of the ground. With the plane and tank in this relative position the operator within the tank then turns the valve 7 from exhaust position to a position admitting fluid pressure into the lines 5 and 6 and thus into the chambers 3, actuating the pistons 22 to retract piston stem portions 23 from engagement with the plane brackets 2 and 2a and the tank is disengaged from the plane. The tank in dropping to the ground strikes the ground first with its rear portion and then with the front portion. In this manner of engagement of the tank with the ground the tendency of the momentum in the tank to overturn the tank is sufficiently retarded to permit the tank to remain in an upright position.

The embodiment of the invention as illustrated in the specification and dawing is now considered the preferred form. Obviously, however, various modifications in the details of construction will suggest themselves to those skilled in the art to which this invention pertains and it is to be understood that I do not wish to limit myself to the exact form of the invention disclosed except as made necessary by the appended claims.

Having thus described the invention what I claim as new and desire to secure by Letters Patent is:

1. A hook-on-and-release mechanism for suspending a fighting tank from an airplane comprising a pair of brackets depending from the airplane adjacent opposite sides of said tank, registering apertures in the walls of said tank and in said brackets, an open ended fluid pressure cylinder having said open end secured to the inner side of the tank wall at each said aperture therein, a piston within said cylinder having a piston stem extending from opposite sides of the piston, resilient means at one side of each said piston normally holding the piston stem at the opposite side of the piston in engagement with the adjacent registering tank wall and bracket apertures, a source of fluid pressure within said tank, supply lines connecting said source with each said fluid pressure cylinders for moving said piston by fluid pressure to disengage the piston stem from said registering apertures, and adjustable means on said cylinder for locking the piston against movement by said fluid pressure.

2. The combination of an airplane, a fighting tank, apertured brackets depending from said airplane at opposite sides of said tank, apertures in the walls of said tank registering with said bracket apertures, fluid pressure cylinders within said tank and secured to the tank wall at the apertures therein, apertures in opposite ends of each said cylinders registering with said adjacent tank apertures, a pressure responsive piston within each cylinder for reciprocal movement therein, a piston stem projecting from opposite sides of each piston, a spring within each cylinder encircling one end of the stem of said contained piston and projecting the opposite end of the piston stem through said adjacent tank aperture into the registering bracket aperture to connect the tank and airplane, an aperture in a wall of each cylinder, a source of fluid pressure within said tank, supply lines connecting each cylinder with said source of fluid pressure and including a valve controlling admission of fluid pressure to said cylinders, and means on each cylinder for locking the contained piston against accidental movement in a direction deflecting said piston spring.

3. In combination, an airplane, a fighting tank, tank suspension means depending from said plane in pairs disposed transversely of the plane and spaced longitudinally thereof, the rear pair of said tank suspension means depending below said front pair, and fluid pressure responsive means on said tank for selective engagement with and release from said tank suspension means.

4. Means for suspending a fighting tank from a moving airplane and for discharging the tank from the plane whilst the latter is in flight comprising pairs of brackets depending from said airplane and spaced longitudinally of the body of said plane a distance sufficient to permit insertion of a portion of the fighting tank between the pairs of brackets, registering apertures in said brackets and inserted tank portion, fluid pressure cylinders within the tank having one end thereof secured to the tank wall at each tank aperture, a piston stem within each cylinder and of a length greater than the length of said cylinder, a piston secured to said piston stem intermediate the ends thereof, a compression spring encircling one end of the piston stem between one side of the piston and the opposite cylinder end wall for normally projecting the opposite end of said piston stem through the adjacent registering tank and bracket apertures, an aperture in the end wall of said cylinder opposite the tank wall, said spring encircled end of the piston stem registering with said latter cylinder aperture, an aperture in said cylinder in front of said piston for admission of fluid pressure to actuate said piston against the pressure exerted thereon by said spring, and detachable means mounted on said cylinder for closing said cylinder end wall aperture to prevent protrusion of said piston stem thereby locking the piston against reciprocal movement within said cylinder.

ALFRED E. ANDERSEN.